United States Patent Office 3,013,087
Patented Dec. 12, 1961

3,013,087
POLYGLYCIDYL ETHERS OF ALKYL-SUBSTITUTED TETRAPHENOLS
Carl G. Schwarzer, Walnut Creek, Calif., assignor to Shell Oil Company, a corporation of Delaware
No Drawing. Filed Mar. 7, 1958, Ser. No. 719,710
1 Claim. (Cl. 260—619)

This invention relates to a novel and improved class of epoxy ethers and to resins which may be prepared therefrom. More particularly, the invention relates to new and useful polyglycidyl ethers of alkyl-substituted tetraphenyl alkanes and to polymeric compositions thereof.

In U.S. Patent 2,806,016, Schwarzer, issued September 10, 1957, the new class of polyglycidyl ethers of $\alpha,\alpha,\Omega,\Omega$-tetraphenolic alkanes are described in detail and their advantages over the other polyglycidyl ethers of the art set forth. While these ethers, it is true, represent an important contribution to the epoxy resin art, they have a number of important defects that are alleviated by this invention. While these epoxy resins of tetraphenolic alkanes are, for example, extremely useful for laminating and molding resins, their utility for surface coating is somewhat limited by the fact that they are in all cases dark colored. To render them suitable for use in cases where light-colored coatings are required, such resins must be loaded with light-colored pigments of fillers—a method which has real limitations and produces, instead of light-colored desirable coatings, coatings having an undesirable yellowish or brownish cast.

It is an object of this invention to afford new light-colored compounds from which epoxy ethers of improved color may be prepared, and a further object of the invention to provide such novel light-colored ethers. A further object of the invention is the provision of new light-colored polymeric resinous polyglycidyl ethers which preserve the many desirable properties of the darker resins described in the noted patent. These objects, and others, are achieved by the present invention.

The improved polyglycidyl ethers of the present invention are derived from an alkyl-substituted tetraphenolic alkane compound, wherein the hydroxyl groups on most of the phenyl radicals are para to the alkane chain; most of the alkyl substituents are ortho to the hydroxyl groups; and the alkane chain has at least two carbon atoms. Examples of such tetraphenols include 1,1,2,2-tetrakis(o-methyl-p-hydroxyphenyl)ethane; 1,1,3,3-tetrakis(o-ethyl-p-hydroxyphenyl)-propane; 1,1,4,4 - tetrakis(o-methyl-p-hydroxyphenyl)butane; 1,1,5,5 - tetrakis(o-butyl-p-hydroxyphenyl)-3-methyl pentane, and the like, which may generally be described by the structural formula

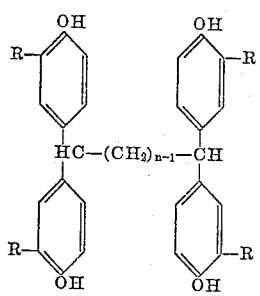

where R is an alkyl radical having 1 to 15 carbon atoms and $n$ is a positive integer.

Also included in the invention, however, are those compounds where all of the hydroxyl groups are not para to the alkane chain as, for example, those having the structure

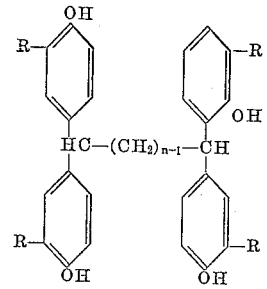

wherein R and $n$ have the above meaning. In such compounds, however, at least three of the hydroxyl radicals are para to the alkane chain. Examples of this latter type of compound include 1,1,2-tri(3-methyl - 4 - hydroxyphenyl)-2-(2-hydroxy-3-methylphenyl)ethane; 1,1,3 - tri-(3 - ethyl - 4 - hydroxyphenyl) - 3 - (2-hydroxy-3-ethylphenyl)propane; 1,1,4-tri(3-propyl - 4 - hydroxyphenyl)-4 - (2 - hydroxy - 3 - propylphenyl)butane; 1,1,5 - tri(3-methyl - 4 - hydroxyphenyl) - 5 - (2 - hydroxy-3-methylphenyl)pentane, and the like. Corresponding compounds containing neutral substituent groups on the alkane chain, as with 1,1,3,3 - tetrakis(o-methyl-p-hydroxyphenyl)-2-chloropropane; 1,1,4,4-tetrakis(o-ethyl-p-hydroxyphenyl)-2,3-dibromobutane, etc., are also included in the invention. While the length of the alkane chain need not be limited, for practical purposes chain lengths of two to ten carbon atoms are preferred, and a chain length of two carbon atoms is particularly preferred.

These o-alkyl-p-hydroxytetraphenols may be readily prepared by condensation of the appropriate dialdehyde with the desired o-alkylphenol. The condensation is effected by mixing the o-alkylphenol and the dialdehyde together using a substantial excess of the phenol over the stoichiometric ratio of four moles of phenol per mole of dialdehyde, saturating the mixture with hydrogen chloride, allowing the reaction to take place, and removing the unreacted o-alkylphenol by such well-known methods as distillation. The o-alkylphenols condense with the dialdehyde in such a way that each terminal carbon atom of the latter is linked to a nuclear carbon atom of the phenol. For steric reasons and by virtue of the strongly ortho, para-directing nature of the hydroxyl group on the phenol, the resultant compound is one in which most of the hydroxyl groups of the four phenyl radicals are para to the connecting alkane chain, while most of the alkyl substituents are ortho to the hydroxyl group thereon, and it is therefore easily crystallizable from the reaction mixture.

The tetraphenylol alkanes of U.S. Patent 2,806,016, when prepared in an analogous manner, are a dark-colored amorphous mass which probably includes the o- and p-hydroxyl tetraphenyl compounds, and which cannot easily be transformed into a cleaner lighter colored product by the usual chemical or physical treatments. In contrast, the $\alpha,\alpha,\Omega,\Omega$ tetrakis(alkane-substituted hydroxyphenyl)alkanes of this invention, when precipitated by cooling from the reaction medium, may be quickly and conviently converted, as by crystallization from such a solvent as acetone, into a sparkling white crystalline compound. This unexpected and desirable difference between the dark amorphous tetraphenylol alkanes of the art and the special light crystalline compounds of this invention is one of the latter's important features.

A wide variety of o-alkylphenols may be condensed with various daldehydes to yield the o-alkylhydroxyphenyl alkanes of the invention. While o-cresol is the particularly preferred substituted phenol, such other phenols as o-ethyl phenol, o-propyl phenol, o-butyl phenol, and the like may be employed. Di-ortho-alkyl phenols, such as ortho-xylenol and di-ortho-ethyl phenol, may similarly be condensed with the dialdehydes. Alkyl substituents having from 1 to 15 carbon atoms may be particularly useful, while unbranched alkyl substituents having from 1 to 8 carbon atoms are preferred.

The polyglycidyl ethers of the invention may be prepared by adding the tetra(o-alkylhydroxyphenyl)alkanes to epichlorohydrin in proportions of about 2 to 10 moles of epichlorohydrin per phenolic hydroxyl group of the alkane, and then adding an alkali metal hydroxide, such as sodium or potassium hydroxide, so as to bring about the desired etherification. It is convenient to dissolve the tetra-o-(alkylphenol) in the substantial stoichiometric excess of epichlorohydrin, and heat the mixture to about reflux temperature. The aqueous hydroxide solution of concentration between about 15% to about 50% is then added gradually with boiling of the reaction mixture. Water added with the caustic and formed in the reaction is removed azeotropically by distillation with the epichlorohydrin.

Distillate condensed from the reaction vapor may readily be separated into an upper aqueous phase which may be discarded and a lower epichlorohydrin phase which may be conveniently returned to the reaction mixture as reflux. It is desirable to add the caustic and conduct the distillation at rates such that the reaction mixture contains at least about 0.5% water in order to have the etherification reaction take place at a reasonably rapid rate. The hydroxide is added in an amount that is equivalent on a stoichiometric basis to the initial amount of the tetra(o-alkylphenol) or a small excess thereof, e.g., 3–5%.

Upon completion of the addition of the aqueous hydroxide and of the etherification reactions, unreacted epichlorohydrin is separated by distillation. The residue from the distillation, which consists primarily of the polyglycidyl ether and salt, may be readily freed of the salt by filtration, and the solids washed with methyl ethyl ketone or similar solvent. The solvent may then easily be flashed off from the collected filtrates to leave the desired polyglycidyl ether.

The polyglycidyl ethers of the tetra(o-alkyl hydroxyphenyl)-alkanes of the invention are solid epoxy resins at 25° C. and have more than one of the hydrogen atoms of the phenolic hydroxyl groups of the tetra(o-alkylphenol) replaced by a glycidyl radical in the average molecule. In general, the average molecule contains about 3 to 4 glycidyl radicals. Other groups in the ether, besides a possible very small amount of unetherified phenolic hydroxyl groups, are dihydroxy glyceryl radicals and chlorohydroxy radicals which likewise are substituted in place of hydrogen atoms of phenolic hydroxyl groups of the starting tetra(o-alkylphenol). The polyglycidyl ethers of the invention are soluble in lower aliphatic ketones as well as in mixtures of an aromatic hydrocarbon containing a substantial portion of such lower ketone.

The new epoxy resins of this invention are light colored, ranging from a pale tan to a light orange, and vary from transparent to cloudy in transmission of light. In this way they are in marked contrast to the dark brown resins of the tetraphenols of U.S. Patent 2,806,016. The resins of the invention undergo cure to hard, temperature-resistant polymeric products after addition thereto of customary epoxy resin curing agents such as dicyandiamide, mono- or polyamines, polycarboxylic acids, anhydrides, etc. In using the polyglycidyl ethers in various applications, they may be mixed with one or more of a variety of other materials such as fillers, solvents including monoepoxy compounds, pigments, and plasticizers.

The invention is illustrated in the following examples, but it is not to be construed as limited to details described therein. Unless otherwise indicated in the examples, the parts and percentages are by weight.

*Example I.—Preparation of 1,1,2,2-tetrakis(o-methyl hydroxyphenyl) ethane*

To a large reaction kettle was added 3,381 parts of orthocresol and 615 parts of glyoxal. The mixture was stirred thoroughly and hydrochloric acid gas was slowly bubbled in. The mixture was heated to 55° C. and held there for about three and a half hours.

At the end of that time the water and light ends were taken off under slightly reduced pressure while the reaction mixture was heated to 100° C., and the ortho-cresol was then flashed off at 40 mm. pressure and 105° C. During the end of the latter flash-off period the kettle temperature was allowed to rise to 160° C. and the pressure to 1 mm., and the bottoms held under these conditions for 40 minutes.

After the bottoms were cooled, they solidified to a brown hard brittle mass. After removal from the kettle, the mass was ground so as to pass through a 20-mesh screen, extracted with petroleum ether to remove residual ortho-cresol, and dried in a vacuum oven at 80° C. The resulting product was washed with acetone and dried under vacuum at 110° C. for two hours.

This treatment yielded a white crystalline powder having the following constitution:

|  | OH eq./100 g. | C, percent | H, percent | M.W. |
| --- | --- | --- | --- | --- |
| Found | 0.88 | 78.8 | 6.7 | 460 |
| Calculated for $C_{30}H_{30}O_4$ | 0.88 | 79.3 | 6.6 | 454 |

This compound was identified as 1,1,2,2-tetrakis(o-methyl hydroxy-phenyl)ethane and had a melting point of 263–267° C.

*Example II.—Preparation of polyglycidyl ether of 1,1,2,2-tetrakis(o-methyl hydroxyphenyl) ethane*

To a 13-liter kettle equipped with a phase-separating head was charged 1,182 parts of the tetra(o-methyl hydroxyphenyl)ethane prepared in the previous example and 4,820 parts of epichlorohydrin. The mixture was heated to reflux temperature and 100 parts of water added to bring the reflux temperature down to 101° C.

To the refluxing mixture was added 500 parts of 48% aqueous NaOH, over a period of about an hour, care being taken to maintain the reflux temperature at about 101° C. At the end of that time the calculated amount of water had been separated. The reaction mixture was cooled and filtered through filter aid, and the salt cake thus separated was washed with methyl ethyl ketone.

The solvent was then flashed off the collected filtrates at a flask temperature of 160° C. and 2 mm. pressure. The resulting product was poured out on aluminum foil and was found to have a light orange color. One thousand four hundred ninety-five parts of the polyglycidyl ether, or an 84.7% yield, was thus obtained. Upon analysis, the glycidyl ether had the following characteristics:

Epoxide _____ 0.509 eq./100 g.
OH value_____ 0.078 eq./100 g.
Durian softening point_____ 85° C.

*Example III.—Curing of polyglycidyl ether of 1,1,2,2-tetrakis (o-methyl hydroxyphenyl)ethane*

A resin prepared as in Example II was dissolved in acetone to the extent of 60 parts of the resin per 100 parts of solution. To this solution was added a measured amount of catalyst solution of a boron trifluoride-monoethylamine complex in acetone so that the resulting mixture contained a specified amount of the complex per hundred parts of the resin. Glass cloth was passed through this solution and dried, and from the resulting glass cloth six-ply laminates were assembled. The laminate assemblies were encased in cellophane and cured under a maximum of 25 p.s.i. for ten minutes at 175° C. to yield a strong laminate of good appearance having the following properties:

| Catalyst Concentration, Parts per 100 Parts Resin | Flexural Strength, p.s.i.×10⁻³ | | |
|---|---|---|---|
| | Room Temp. | 300° | 500° |
| 1.5 | 84 | 52 | 35 |
| 2.0 | 80 | 61 | 35 |

Its hardness was comparable to that of the cured laminates prepared from the tetraphenol resins described in U.S. Patent 2,806,016.

I claim as my invention:

1,1,2,2-tetrakis(o-methyl-p-hydroxyphenyl)ethane.

References Cited in the file of this patent

UNITED STATES PATENTS

| | | |
|---|---|---|
| 2,211,070 | Moss | Aug. 13, 1940 |
| 2,333,548 | Nieder | Nov. 2, 1943 |
| 2,515,909 | Stevens et al. | July 18, 1950 |
| 2,636,002 | Capell et al. | Apr. 21, 1953 |
| 2,806,016 | Schwarzer | Sept. 10, 1957 |